2 Sheets—Sheet 1.

P. F. HODGES & F. S. BLIM.
GRAIN-BINDER.

No. 189,221. Patented April 3, 1877.

Witnesses.
A. Ruppert
J. G. Mason

P. F. Hodges
F. S. Blim
Inventors.
D. P. Holloway & Co.
Atty

2 Sheets—Sheet 2.
P. F. HODGES & F. S. BLIM.
GRAIN-BINDER.
No. 189,221. Patented April 3, 1877.
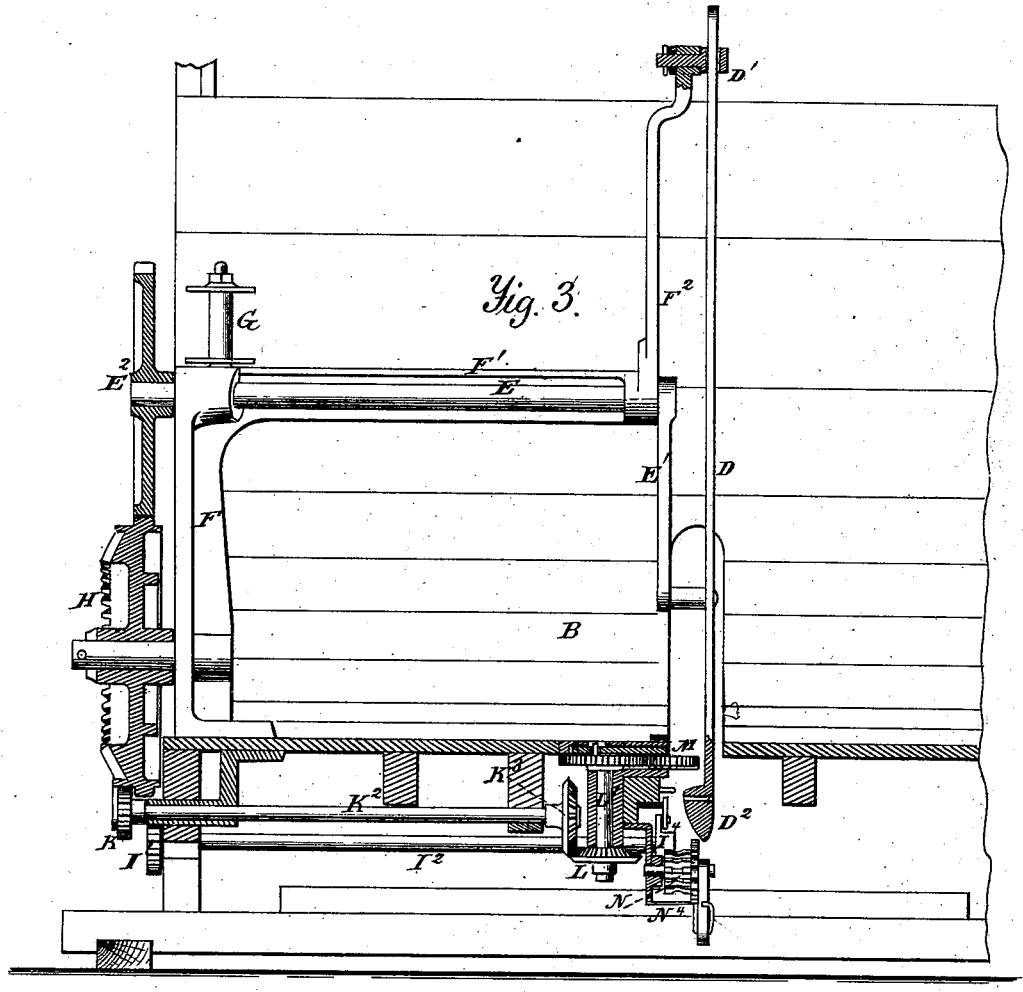
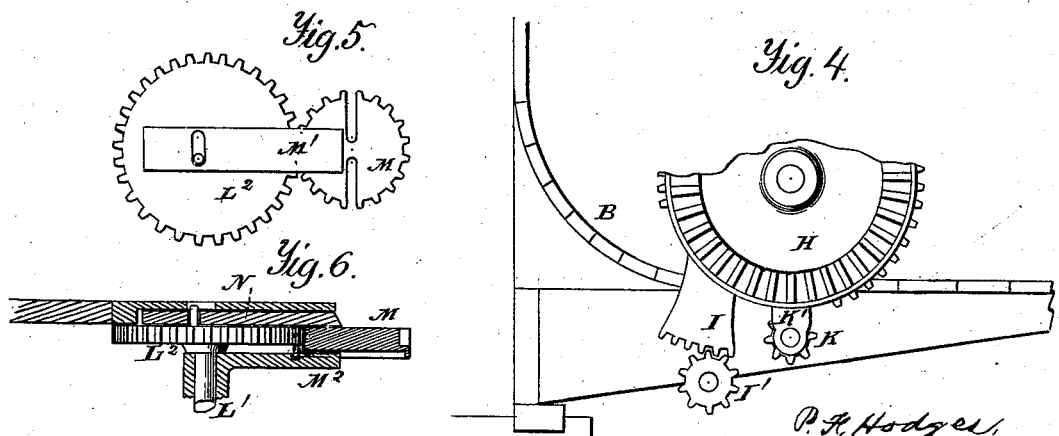
Witnesses.
A. Ruppert,
J. T. Mason
Inventors.
P. F. Hodges,
F. S. Blim
D. P. Holloway & Co.

UNITED STATES PATENT OFFICE.

PLINY F. HODGES AND FRANK S. BLIM, OF MASSILLON, OHIO; SAID BLIM ASSIGNOR TO SAID HODGES; SAID HODGES ASSIGNOR OF ONE-HALF HIS RIGHT TO WM. McCLYMONDS, OF SAME PLACE.

IMPROVEMENT IN GRAIN-BINDERS.

Specification forming part of Letters Patent No. 189,221, dated April 3, 1877; application filed February 12, 1877.

*To all whom it may concern:*

Figure 1:
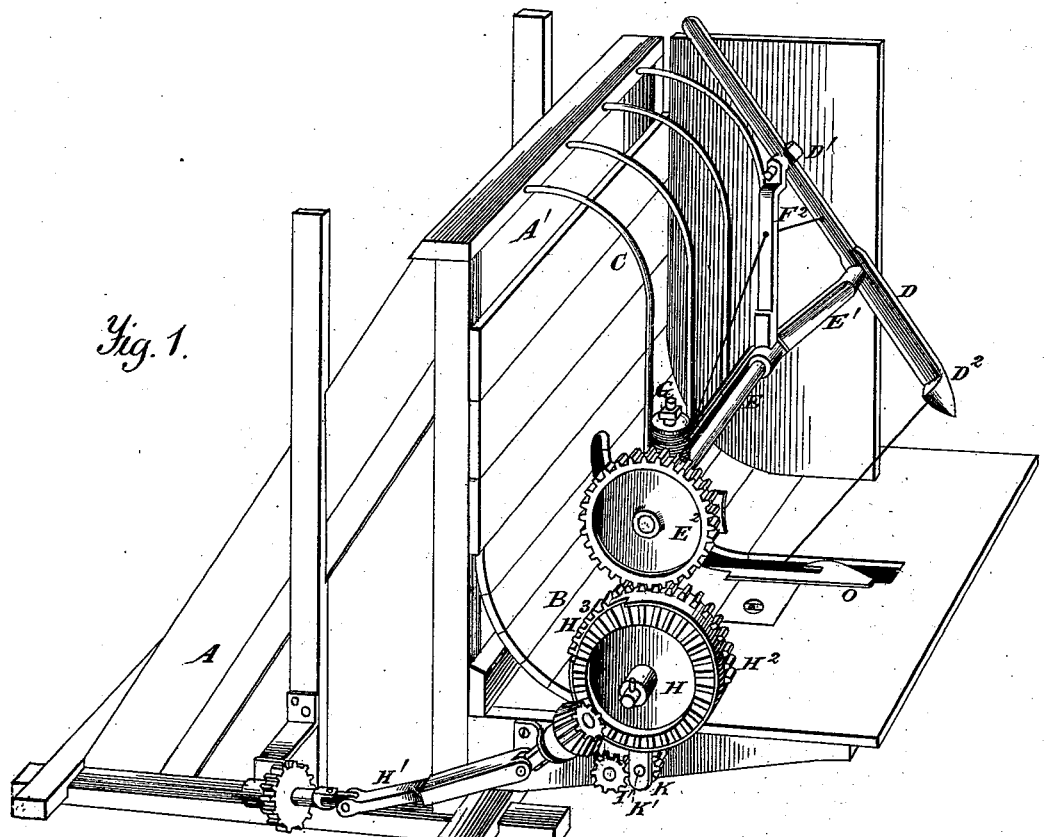
Figure 2:
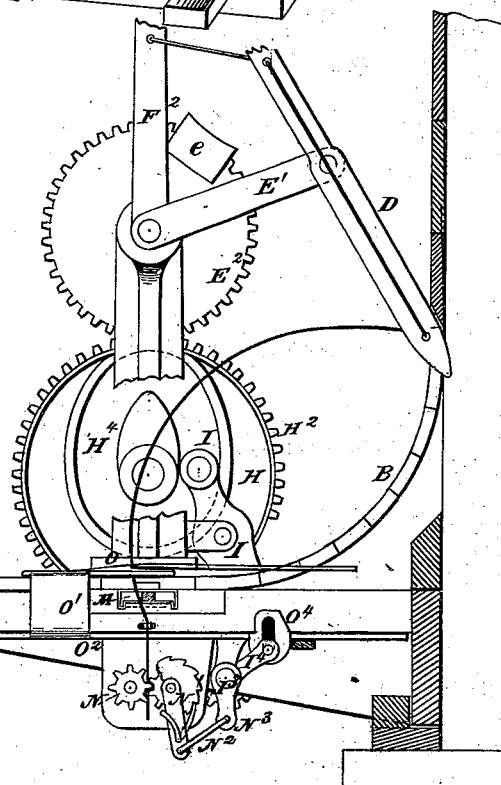
Figure 7:

Be it known that we, PLINY F. HODGES and FRANK S. BLIM, of Massillon, in the county of Stark and State of Ohio, have invented a new and useful Improvement in Grain-Binders, of which the following is a specification:

In the annexed drawings, making part of this specification, Figure 1 is a perspective view. Fig. 2 is a vertical transverse section. Fig. 3 is a vertical longitudinal section. Fig. 4 is a sectional elevation of the mechanism for operating the twister. Fig. 5 is a plan of the twister and cutting-chisel. Fig. 6 is a section of the same; and Fig. 7 is an elevation, showing one of the wheels for holding the wire.

The same letters are employed in all the figures in the designation of identical parts.

The machine belongs to that class in which a wire is employed in binding the sheaf as formed.

A is the frame, which is attached to the platform of a harvester, and provided with an elevator, by which the grain is raised and discharged upon the platform B at A'. Fingers C confine the grain and cause it to be delivered upon the platform, where it is held until enough of it to form a sheaf is separated from the mass by the oscillating arm D, one end of which slides in the swiveling eye $D^1$, and the other is formed with a pointed head to receive the wire. The arm D is actuated by a crank, $E^1$, upon the shaft E, which receives an intermittent revolution from the wheel $E^2$. The shaft E is supported by the bracket F $F^1$. An arm, $F^2$, carries the swiveling eye $D^1$.

The wire is carried upon a spool, G, on frame F, and extends thence through a hole in arm $F^2$; thence through a hole in arm D, and along it and back through the head $D^2$, and thence to the holding and twisting mechanism under the platform, which is slotted to permit the free movement of arm D in passing the wire under the sheaf.

Motion is communicated by the driving-wheel H, operated by the tumbling-shaft $H^1$, and having various sets of cogs to give the requisite movements to the different parts. Thus the peripheral spur-gearing $H^2$ engages the teeth of wheel $E^2$, and gives an intermittent rotation thereto, produced by leaving a blank space in $H^2$. The intermediate space is occupied by a flange, which prevents the wheel $E^2$ from moving while the flange is passing under the stop $e$. The number of cogs in $H^2$ corresponds to the number in $E^2$, so that the wheel H will give one revolution to the crank $E^1$, and then allow it to remain stationary while the twister is uniting the wire. Another segmental spur-gear at $H^3$ also gives intermittent rotation to the twister-shaft, holding it stationary at the completion of each rotation by the same device of flange and stop. Another shaft is given intermittent oscillation by means of a cam and groove in the back of the wheel shown at $H^4$ in Fig. 2. The cam bears against a stud-pin on the lever I, on the free end of which is a segmental gearing sufficient to give one half-revolution to the spur-pinion $I^1$ at each movement to and fro of the lever, thus causing the shaft $I^2$ to oscillate about a half-revolution at each revolution of the driving-wheel, the purpose being to draw down the twisted part of the wire.

The twister is operated as follows: It receives intermittent revolution from the segment $H^3$, being, during the remainder of its revolution, held stationary by the stop $K^1$ bearing against the plain surface of the wheel H. The shaft $K^2$ carries a bevel-wheel, $K^3$, driving the wheel L on the short vertical shaft $L^1$, and the spur-wheel $L^2$ on the top of the shaft. The twister-wheel M has a recessed slit on each side, as shown in Fig. 5, and is driven by the pinion $L^2$, engaging teeth in its periphery. The wire being received in the slits, the rotation of the wheel M will cause the wires to be twisted together above and below the wheel. When this is done, the chisel M' will be projected by the action of a stud-pin on wheel $L^2$, and cut the wires immediately above the twister.

One piece of wire being held between the fluted wheels N $N^1$, the rotation of these wheels will draw down the severed section out of the twister and carry away the twisted part, so as to leave a section of smooth wire passing up through the twister to assist in forming a new twist, when the wire has again been passed around the sheaf and brought back to the twister by the movement of the arm D. The following mechanism performs this function: Two fluted rollers, N $N^1$, are formed substantially as shown in Fig. 7, being cut away on the sides of the flutes to allow the knotted part of the wire to pass through the wider parts, serving as cogs to communicate motion from one to the other. The roller $N^1$ is driven by a feed arm and pawl, $N^2$, acting on a ratchet on the roller-shaft. The crank $N^3$ gives forward motion to the ratchet and roller, and a spring-stop, $N^4$, holds the roller while the pawl is being drawn back. The crank $N^3$ is on the end of the shaft $I^2$, which is made to oscillate by the segment-lever I. Another crank-arm, $I^4$, extends upward from shaft $I^2$, carrying a wrist-pin, which is inserted in a vertical slot in the plate $O^4$, attached to a sliding bar, $O^2$, connected by the bracket $O^1$ with the slotted slide O, moving on one side of the slot in platform B, and immediately above the twister. The slide forms a hook intended to seize the wire as it is being drawn off by the arm D, and carry it forward into one of the slits in the twister-wheel, and there hold it until the wire passed around the sheaf is brought into the other slit, when the wheel M is revolved and the wire twisted and cut. The sliding plate O also serves as a guard to keep straw out of the twister.

The operation of the mechanism is indicated by the foregoing description. The wire is coiled on the spool G. Its free end is passed through the arm $F^2$, then through oscillating arm D, and down to and back through the head $D^2$; thence through the hook in plate O and the rearmost slit in the twister-wheel, and then down between the rollers N $N^1$, which confine the free end. The platform being filled with straw in front of the arm D, the rotation of wheel H will cause the arm to be raised, drawing the wire off the spool, and carrying it around the sheaf. Striking forward, the head penetrates the straw on the platform and separates enough to make a sheaf. Continuing to revolve, it passes the wire under the sheaf, and into the front slit in the twister-wheel, and stops. The twister-wheel is now rotated, and forms a twist in the wire above and below the wheel, thus uniting the wires around the sheaf, and also fastening the wire in the end of the arm D to the free end of the wire held by the rollers. The chisel then comes forward and cuts the wire above the twister, freeing the sheaf, which is swept from the platform by the renewed backward sweep of the arm D. The wire through the head being fastened to the section held by the rollers, the wire will be again drawn out, and the hook O will come forward, catch it, and carry it into the slit in the twister-wheel. At the same time the movement of shaft $I^2$, which operates the hook-plate, will cause a revolution or partial revolution of the fluted rollers, and draw down the twisted part of the wire, so as to leave smooth wire for the action of the twister. This twisted part is wasted, and should be run into a box placed below the rollers to receive it.

To adapt the machine to use in long or short straw, the platform and frame are made to slide along the platform of the machine. To permit this adjustment the tumbling-shaft H' has a universal joint at each end of the connecting-bar, and this is formed with a slip-joint, so as to be lengthened or shortened as the platform is shifted.

The twister-wheel has no shaft, but is supported on the plate $M^2$, which has on its outer end a semicircular groove to receive a corresponding flange on the lower edge of the twister-wheel, as shown in Fig. 6. This flange extends outward under the cogs, and then downward, performing the double function of supporting the twister, and also of forming a guard to prevent the wire from catching in the peripheral teeth of the twister. Another plate overlies the twister, which latter projects into the slot or open space between the frame-timbers of the platform far enough to expose the opposite slits intended to receive the wire.

What we claim as our invention, and desire to secure by Letters Patent, is—

1. The swinging and reciprocating wire-carrying arm, provided with a lateral projection at its point, through which the wire passes, combined with the overhung twisting-pinion, so that said arm will pass by the pinion, and carry the wire to the center thereof, both in its upward movement to gather the gavel, and in its forward movement to compress the same, substantially as set forth.

2. In combination with the slotted platform B and twister, arranged to overhang one side of the slot, the wire-carrying arm free to enter the slot at one end, pass the twister, and escape at the other end, substantially as set forth.

3. In combination with the twister and wire-carrying arm, the fluted rollers N N', and ratchet and double pawls, and oscillating shaft $I^2$, pinion $I^1$, swinging segment I, and cam for oscillating it, substantially as set forth.

4. In combination with the twister-pinion M and the driving-pinion $L^2$, revolving in the same plane, the wrist-pin on the driving-pinion, and slotted reciprocating chisel, operated by the wrist-pin, for shearing the wires above the twister, while the free end is held by the rollers below the twister, substantially as set forth.

5. In combination with the twister-pinion and wire-carrying arm, revolving so as to carry the wire under and over the twister, the reciprocating hooked plate O, actuated by the shaft $I^2$ through the arm $I^4$ and intermediate connections, for catching and confining the wire, substantially as set forth.

In testimony whereof we have signed our names to this specification in the presence of two subscribing witnesses.

PLINY F. HODGES.
FRANK S. BLIM.

Witnesses:
L. C. COLE,
J. J. WEEKS.